(12) United States Patent
Fukuda

(10) Patent No.: US 7,881,300 B2
(45) Date of Patent: Feb. 1, 2011

(54) BROADCASTING BETWEEN SUBNETWORKS CONNECTED VIA A ROUTER

(75) Inventor: Hidekazu Fukuda, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 12/174,750

(22) Filed: Jul. 22, 2008

(65) Prior Publication Data

US 2008/0291931 A1    Nov. 27, 2008

Related U.S. Application Data

(63) Continuation of application No. 10/795,949, filed on Mar. 8, 2004, now Pat. No. 7,408,934.

(30) Foreign Application Priority Data

Mar. 13, 2003    (JP) .............................. 2003-067725

(51) Int. Cl.
  *H04L 12/54* (2006.01)
(52) U.S. Cl. ...................... 370/392; 370/390
(58) Field of Classification Search ............. 370/230, 370/230.1, 231, 235, 270, 351, 352, 357, 370/389, 396, 395.3, 400, 428
  See application file for complete search history.

(56) References Cited

U.S. PATENT DOCUMENTS

| | | | | |
|---|---|---|---|---|
| 5,740,375 A | * | 4/1998 | Dunne et al. | ................. 709/238 |
| 6,473,413 B1 | * | 10/2002 | Chiou et al. | ................. 370/331 |
| 6,483,832 B1 | | 11/2002 | Civanlar et al. | |
| 6,880,089 B1 | | 4/2005 | Bommareddy et al. | |
| 2002/0042706 A1 | * | 4/2002 | Rodriguez | ................... 703/22 |
| 2002/0052972 A1 | | 5/2002 | Yim | |
| 2003/0126252 A1 | * | 7/2003 | Abir | .......................... 709/223 |

* cited by examiner

*Primary Examiner*—Ricky Ngo
*Assistant Examiner*—Wei-Po Kao
(74) *Attorney, Agent, or Firm*—Patrick J. Daugherty; Driggs, Hogg, Daugherty & Del Zoppo Co., LPA

(57) ABSTRACT

The present invention allows the contents of network-wide broadcast in a first subnetwork to be passed to a second subnetwork even if a router is set to prevent the network-wide broadcast in the first subnetwork from going out of the first subnetwork. In response to the network-wide broadcast in the first subnetwork, a first broadcast relay generates a packet in which a destination address of the network-wide broadcast packet is changed to an address of a second broadcast relay belonging to a second subnetwork, and outputs the address changed packet to the first subnetwork. The second broadcast relay generates, in response to the packet addressed thereto, a second subnetwork-only broadcast as a local broadcast, and outputs it to the second subnetwork. A server of the second subnetwork performs a predetermined process on the broadcast outputted by the second broadcast relay.

8 Claims, 4 Drawing Sheets

BROADCASTING BETWEEN SUBNETWORKS CONNECTED VIA A ROUTER

CROSS-REFERENCE TO RELATED APPLICATIONS

This application is a continuation of U.S. application Ser. No. 10/795,949, filed Mar. 8, 2004, now U.S. Pat. No. 7,408,934 which claims priority of Japanese application Serial No. 2003-067725, filed Mar. 13, 2003.

FIELD OF THE INVENTION

The present invention relates to a broadcast processing system, a broadcast processing apparatus, sending broadcast processing apparatus, receiving broadcast processing apparatus, broadcast processing method, sending broadcast processing method, receiving broadcast processing method, broadcast processing program, sending broadcast processing program and receiving broadcast processing program for performing a predetermined process as to a broadcast generated in a subnetwork, and in particular, to the broadcast processing system, broadcast processing apparatus, sending broadcast processing apparatus, receiving broadcast processing apparatus, broadcast processing method, sending broadcast processing method, receiving broadcast processing method, broadcast processing program, sending broadcast processing program and receiving broadcast processing program capable of conveying a network-wide broadcast generated in a predetermined subnetwork to another desired subnetwork even if passage of the network-wide broadcast is limited by a router or the like.

BACKGROUND ART

In the IP (Internet Protocol), a subnetwork-only broadcast called a local broadcast, and a network-wide broadcast are defined. In order to avoid unnecessary traffic and achieve security, a router is configured to prevent the network-wide broadcast from going out of a subnetwork. However, it may happen that a broadcast generated in a predetermined subnetwork should desirably be notified to a predetermined external subnetwork.

Background Art 1:

In the case where subnetworks A1 and A2 included in a network adopting DHCP (Dynamic Host Configuration Protocol) are a subnetwork having no DHCP server therein and a subnetwork having a DHCP server therein, respectively, when a DHCP client in the subnetwork A1 outputs a network-wide broadcast (255.255.255.255) inside the subnetwork A1 for the sake of requesting an IP address, a DHCP relay agent in the subnetwork A1 changes the address of the IP packet related to the network-wide broadcast to the address of the DHCP server in the subnetwork A2 and outputs it to the subnetwork A1 so that the packet will reach the DHCP server in the subnetwork A2.

Background Art 2:

In a network including an IBM Director server and an IBM Director broadcast relay agent, the server outputs to a subnetwork B1 a packet having a destination address which is the one of the broadcast relay agent in a subnetwork B2 different from the subnetwork B1 to which the server belongs. Upon receiving the packet, the broadcast relay agent in the subnetwork B2 outputs a broadcast for the subnetwork B2 to the subnetwork B2.

Problems of the background art 1 are as follows.

(1) Among the broadcasts generated in the subnetwork A1, it is only a DHCP broadcast that has its contents notified to another subnetwork A2.

(2) The DHCP server in the subnetwork A2 only uses a unicast received from the DHCP relay agent in the subnetwork A1 for the sake of its own processing, and any host in the subnetwork A2 is not informed of the contents of broadcast in the subnetwork A1.

Problems of the background art 2 are as follows.

(1) The IBM Director server in the subnetwork B1 only sends a notice of broadcast for the subnetwork B2 to the broadcast relay agent in the subnetwork B2 for its own use, and the contents of network-wide broadcast generated by any host in the subnetwork B1 are not notified to the subnetwork B2.

(2) For a network-wide broadcast generated by any host in the subnetwork B1, its contents are not notified to any host in the subnetwork B2.

(3) Any host belonging to the subnetwork B1 other than the IBM Director server must know the existence and address of the broadcast relay agent in advance to pass a broadcast to the subnetwork B2 via the broadcast relay agent.

SUMMARY OF THE INVENTION

An object of the present invention is to provide a broadcast processing system, broadcast processing apparatus, sending broadcast processing apparatus, receiving broadcast processing apparatus, broadcast processing method, sending broadcast processing method, receiving broadcast processing method, broadcast processing program, sending broadcast processing program and receiving broadcast processing program capable of, despite existence of a router which blocks transmission of network-wide broadcasts from a first subnetwork to a second subnetwork, treating a predetermined network-wide broadcast in the first subnetwork as the one generated in the second subnetwork.

Another object of the present invention is to provide a broadcast processing system, broadcast processing apparatus, sending broadcast processing apparatus, receiving broadcast processing apparatus, broadcast processing method, sending broadcast processing method, receiving broadcast processing method, broadcast processing program, sending broadcast processing program and receiving broadcast processing program capable of, despite existence of a router which blocks transmission of network-wide broadcasts from the second subnetwork to the first subnetwork, treating a predetermined network-wide broadcast in the second subnetwork as the one generated in the first subnetwork.

A further object of the present invention is to provide a broadcast processing system, broadcast processing apparatus, sending broadcast processing apparatus, receiving broadcast processing apparatus, broadcast processing method, sending broadcast processing method, receiving broadcast processing method, broadcast processing program, sending broadcast processing program and receiving broadcast processing program allowing hosts in the first and second subnetworks to communicate with each other by the network-wide broadcast in which communication of the network-wide broadcast between the first and second subnetworks is blocked by the router.

The broadcast processing system of the present invention has the following.

One or more first routers for preventing a network-wide broadcast packet in a first subnetwork from reaching a second subnetwork which is different from the first subnetwork;

A first broadcast relay belonging to the first subnetwork for, upon detecting the network-wide broadcast packet in the first subnetwork, generating a unicast address changed packet in which a destination address of the network-wide broadcast packet is changed to an address of a second broadcast relay belonging to the second subnetwork and outputting the address changed packet inside the first subnetwork; and The second broadcast relay belonging to the second subnetwork for, upon receiving a packet addressed thereto, generating a first-type broadcast packet in which the destination address of the received packet is changed to the one related to a first-type broadcast, and outputting the first-type broadcast packet inside the second subnetwork.

The broadcast processing system of the present invention described above may additionally include one or more of the following technical matters (a1) to (a5) in any combination.

(a1) One or more second routers for preventing the address changed packet in the second subnetwork from reaching the first subnetwork are included, wherein the second broadcast relay generates, upon detecting the address changed packet in the second subnetwork, a unicast address changed packet in which a destination address of the network-wide broadcast packet is changed to an address of the first broadcast relay and outputs the address changed packet inside the second subnetwork, and the first broadcast relay generates, upon receiving a packet whose destination address is its own address, a first-type broadcast packet in which the destination address of the address changed packet is changed to the one related to a first-type broadcast and outputs the first-type broadcast packet inside the first subnetwork.

(a2) The first-type broadcast is a broadcast dedicated to the subnetwork in which it is outputted.

(a3) The first router includes a router for preventing the address changed packet in the first subnetwork from going out of the first subnetwork, and the second router includes a router for preventing the address changed packet in the second subnetwork from going out of the second subnetwork.

(a4) The first and second subnetworks are interconnected via a subnetwork other than the first and second subnetworks, or the Internet.

(a5) There exist a plurality of the second subnetworks having network addresses which are different from each other, the second broadcast relay exists in each second subnetwork, and upon detecting one network-wide broadcast packet, the first broadcast relay generates a plurality of address changed packets, from the one network-wide broadcast packet, in which the destination address of the one network-wide broadcast packet is changed to the addresses of the respective second broadcast relays and outputs the plurality of address changed packets inside the first subnetwork.

A single router may function as both the first and second routers. The packet may be the one compliant with an IP, or IP packet. In the IP packet, the destination address exists in an IP header. The present invention can use the TCP/IP and UDP/IP standards. The first-type broadcast may be a network-wide broadcast as well as a subnetwork-only broadcast. In a small-scale network having a few segments, it may be assured that a router for controlling incoming and outgoing of the packets in the subnetwork to which a receiving broadcast relay belongs does not allow the network-wide broadcast to go out of the subnetwork. In such a case, for a unicast received by the second or first broadcast relay from the first or second broadcast relay, a broadcast to be outputted to the second or first subnetwork may be a network-wide broadcast instead of a local broadcast as a subnetwork-only broadcast.

The broadcast processing apparatus of the present invention has a sending broadcast processing apparatus and receiving broadcast processing apparatus belonging to the first and second subnetworks, respectively. The sending broadcast processing apparatus has network-wide broadcast detecting means for detecting a network-wide broadcast in the first subnetwork, address changed packet generating means for generating a unicast address changed packet in which a destination address of a network-wide broadcast packet related to the network-wide broadcast detected by the network-wide broadcast detecting means is changed to the address of the receiving broadcast processing apparatus, and address changed packet outputting means for outputting the address changed packet inside the first subnetwork. The receiving broadcast processing apparatus has receiving means for receiving a packet addressed to the receiving broadcast processing apparatus, first-type broadcast packet generating means for generating a first-type broadcast packet in which the destination address of the packet received by the receiving means is changed to the one related to a first-type broadcast, and broadcast outputting means for outputting the first-type broadcast packet generated by the first-type broadcast packet generating means inside the second subnetwork.

The broadcast processing apparatus of the present invention described above may additionally include one or more of the following technical matters (b1) and (b2) in any combination.

(b1) The first-type broadcast is a broadcast dedicated to the subnetwork in which it is outputted.

(b2) The first and second subnetworks are interconnected via a subnetwork other than the first and second subnetworks, or the Internet.

The broadcast processing method of the present invention has a sending broadcast processing method and a receiving broadcast processing method to be implemented respectively by a sending broadcast processing apparatus and a receiving broadcast processing apparatus belonging to the first and second subnetworks, respectively. The sending broadcast processing method has a network-wide broadcast detecting step of detecting a network-wide broadcast in the first subnetwork, an address changed packet generating step of generating a unicast address changed packet in which a destination address of a network-wide broadcast packet related to the network-wide broadcast detected by the network-wide broadcast detecting step is changed to the address of the receiving broadcast relay, and an address changed packet outputting step of outputting the address changed packet inside the first subnetwork. The receiving broadcast processing method has a receiving step of receiving a packet addressed to the receiving broadcast relay, a first-type broadcast packet generating step of generating a first-type broadcast packet in which a destination address of the packet received by the receiving step is changed to the one related to a first-type broadcast, and a broadcast outputting step of outputting the first-type broadcast packet generated by the first-type broadcast packet generating step inside the second subnetwork.

The broadcast processing method of the present invention described above may additionally include one or more of the following technical matters (c1) and (c2) in any combination.

(c1) The first-type broadcast is a broadcast dedicated to the subnetwork in which it is outputted.

(c2) The first and second subnetworks are interconnected via a subnetwork other than the first and second subnetworks, or the Internet.

The broadcast processing program of the present invention causes a computer to execute the steps of the aforementioned broadcast processing method. The sending broadcast processing program of the present invention causes the computer to execute the steps of the aforementioned sending broadcast processing method. The receiving broadcast processing program of the present invention causes the computer to execute the steps of the aforementioned receiving broadcast processing method.

In one aspect, broadcast processing systems are provided comprising a first subnetwork comprising a first device and a first broadcast relay; a router in communication with the first subnetwork; and a second subnetwork different from the first subnetwork and in communication with the router, the second subnetwork comprising a second device and a second broadcast relay. The router is configured to prevent a first subnetwork network wide broadcast packet from the first subnetwork from reaching the second subnetwork. The first broadcast relay is configured to detect a first subnetwork network wide broadcast packet from the first device in the first subnetwork, and in response to the detected packet having a first subnetwork network-wide destination address, a broadcast host address and a destination port number, generate a unicast address changed packet from the detected packet by changing the network wide destination address to a unicast address of the second broadcast relay in the second subnetwork, and output said unicast address changed packet through the router to the second broadcast relay. The second broadcast relay is configured to receive in said second subnetwork the unicast address changed packet addressed to said second receiving broadcast relay, generate a second subnetwork-type broadcast packet by changing the destination unicast address of the packet received by said second receiving broadcast relay to an address related to a second subnetwork-type broadcast, and output said generated second subnetwork-type broadcast packet inside said second subnetwork. The second subnetwork second device is configured to receive the second subnetwork-type broadcast packet, check a port number of a protocol segment of the received second subnetwork-type broadcast packet, and perform a predetermined process if the port number corresponds to a process of the second device or take no action if the port number does not correspond to a process of the second device.

In another aspect, articles of manufacture are provided comprising a computer readable medium, the computer readable medium comprising computer executable program code, wherein the program code, when deployed and executed on a computer system, causes the computer system to, in response to detecting a first subnetwork network wide broadcast packet in a first subnetwork, the packet having a first subnetwork network-wide destination address, a broadcast host address and a destination port number, generate a unicast address changed packet from the detected packet by changing the network wide destination address to a unicast address of a second broadcast relay in the second subnetwork; output said unicast address changed packet through a router to the second broadcast relay, the router configured to prevent the first subnetwork network wide broadcast packet from reaching the second subnetwork; cause the second broadcast relay to generate a second subnetwork-type broadcast packet by changing the destination unicast address of the unicast address changed packet to an address related to a second subnetwork-type broadcast in said second subnetwork; cause the second broadcast relay to output said generated second subnetwork-type broadcast packet inside said second subnetwork; and cause the second device on the second subnetwork to receive the second subnetwork-type broadcast packet, check a port number of a protocol segment of the second subnetwork-type broadcast packet; and perform a predetermined process if the port number corresponds to a process of the second device or take no action if the port number does not correspond to a process of the second device.

PREFERRED EMBODIMENT OF THE INVENTION

Figure 1:
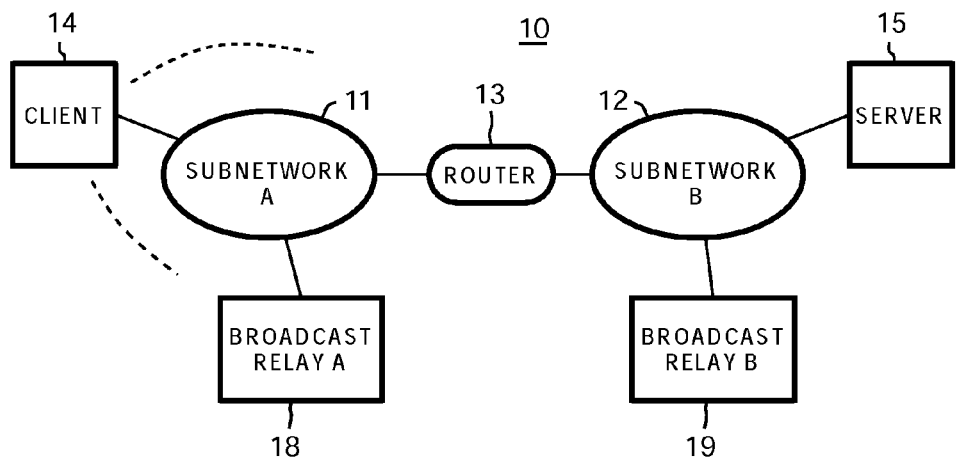
FIG. 1 is a block diagram of a broadcast processing system.

The embodiment of the present invention will now be concretely described. It should be noted that the present invention is not limited to the embodiment and various modifications may be made without departing from the gist of the invention. FIG. 1 is a block diagram of a broadcast processing system 10. A router 13 is interposed between a subnetwork A (reference numeral 11) and a subnetwork B (reference numeral 12), and refers to a destination address of each IP packet in the subnetwork A and in the subnetwork B so as to control passage of the IP packet based on the reference. A header of the IP packet includes information on destination and source addresses. In the IP, the IP packet having the destination address of 255.255.255.255 is defined as the one for network-wide broadcast. Also, the IP packet having a host address of all 1's in the destination address is defined as the one for broadcast dedicated to a network indicated by a network address in the destination address. From the viewpoint of traffic control and security in the broadcast processing system 10, the router 13 is set to prevent network-wide broadcasts generated in the subnetworks A and B from going out of the respective subnetworks A and B. A server 15 is connected to the subnetwork B, and a broadcast relay A (reference numeral 18) and a broadcast relay B (reference numeral 19) are connected to the subnetworks A and B, respectively. A plurality of clients 14 are connected to the subnetwork A, and output network-wide broadcasts to the subnetwork A as required. Some broadcasts outputted by the clients 14 to the subnetwork A may have the contents to be processed by the server 15.

The operation of the broadcast processing system 10 will be described on the assumption that it is compliant with TCP/IP and TCP/UDP. A client 14 outputs a network-wide broadcast to the subnetwork A. Upon detecting a packet for the network-wide broadcast, the broadcast relay A generates an address changed packet in which the destination address of the network-wide broadcast packet is changed to the IP address of the broadcast relay B. The address changed packet is for unicast because it is addressed to the broadcast relay B. The broadcast relay A outputs the address changed packet generated from the packet for the network-wide broadcast to the subnetwork A. Since the address changed packet is for the unicast and it is addressed to a host outside the subnetwork A, the router 13 sends the address changed packet to the outside of the subnetwork A so that the address changed packet reaches the subnetwork B. When the broadcast relay B detects an IP packet (the address changed packet from the broadcast relay A is naturally included in this IP packet) in which a destination address is the IP address of the broadcast relay B, the broadcast relay B generates a local broadcast packet in which the destination address of the address changed packet is changed to the IP address related to subnetwork B-only broadcast (this broadcast is called "local broadcast" because it is dedicated to the subnetwork B), and then outputs the local broadcast packet to the subnetwork B. The server 15 receives the local broadcast packet, and performs a predetermined process based on its port number (typically, a destination port number only). The results of the processing operation by the server 15 are outputted to the subnetwork B by the IP packet related to the network-wide broadcast.

When the broadcast relay B detects the network-wide broadcast in the subnetwork B, the broadcast relay B generates an address changed packet in which the destination address of the network-wide broadcast packet or IP packet related to the network-wide broadcast is changed to the broadcast relay A, and then outputs the address changed packet to the subnetwork B. Since the address changed packet is for the unicast and its destination address is outside the subnetwork B, the router 13 sends the address changed packet to the outside of the subnetwork B so that the address changed packet reaches the subnetwork A. When the broadcast relay A detects the IP packet in which the destination address is the IP address of the broadcast relay A, the broadcast relay A generates a local broadcast packet in which the destination address of the IP packet is changed to the IP address related to subnetwork A-only broadcast, and then outputs the local broadcast packet to the subnetwork A. A predetermined client 14 receives the local broadcast packet, and performs a predetermined process based on its port number (typically, the destination port number only).

Thus, a client 14 in the subnetwork A can output the network-wide broadcast to the subnetwork A to have the predetermined process performed by the server 15 belonging to the subnetwork B different from the subnetwork A, and receive its results from the server 15. In this case, a host H1 which has delivered to the subnetwork A the network-wide broadcast desired to be sent to the subnetwork B and a host H2 which processes the broadcast delivered inside the subnetwork A as a reply from a predetermined host in the subnetwork B do not need to be the same, that is, they may be different from each other.

The present invention may be applied to WOL (Wake On LAN) and PXE (Preboot eXecution Environment). In the case of the WOL, a WOL signal is delivered by the broadcast to a network card of every sleeping host (a host is said to be "sleeping" if the host itself is powered off while its network card is powered on), and the sleeping host wakes when it receive the WOL signal. The PXE is executed on the host thus waken. The PXE is a mechanism for loading an OS startup boot program on the host via the network. A PXE boot request is implemented as a DHCP option. A host Hw which delivers the WOL and a host Hp which is waken by the WOL and issues the PXE request may exist in different subnetworks, respectively, and the WOL and PXE request are delivered by the network-wide broadcast. Also, a server Hs which provides the OS startup boot program in response to the PXE request may exist in the same network as Hw or exist in a subnetwork other than those to which Hw and Hp belong to. According to the present invention, it is possible to implement the WOL and PXE in the hosts belonging to different subnetworks without trouble.

Figure 2:
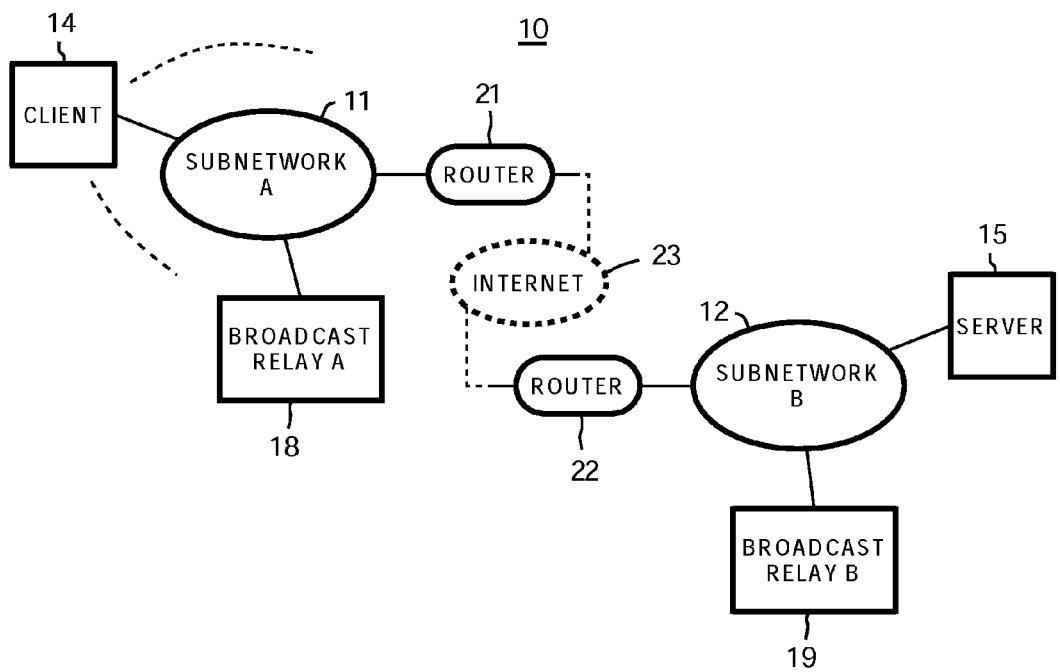
FIG. 2 is a block diagram of a different broadcast processing system.

FIG. 2 shows another configuration of the broadcast processing system 10. The same components as those in FIG. 1 are denoted by the same reference numerals as in FIG. 1, which will not be described further, and the differences from the configuration in FIG. 1 will be mainly described. Routers 21 and 22 are provided at connection points for connecting the subnetworks A and B to an external network so as to control passage of IP packets to the inside and outside of the subnetworks A and B. Network-wide broadcasts of the subnetworks A and B are prevented from passing to the outside of the subnetworks A and B by the routers 21 and 22, respectively. The routers 21 and 22 are interconnected via a communication channel such as the Internet 23. The address changed packet in which the broadcast relay A has changed the destination address of the network-wide broadcast packet in the subnetwork A to the IP address of the broadcast relay B and the address changed packet in which the broadcast relay B has changed the destination address of the network-wide broadcast packet in the subnetwork B to the IP address of the broadcast relay A pass the routers 21 and 22 and reach the subnetworks B and A, respectively, via the communication channel such as the Internet 23. Even if the subnetworks A and B are not adjacent to each other, and one or more communication channels such as the Internet 23 or other channels (the channels may include subnetworks) are interposed therebetween, it is possible, by the same operation as that described with reference to FIG. 1, to pass the network-wide broadcasts in the subnetworks B and A to the subnetworks A and B, respectively.

Figure 3:
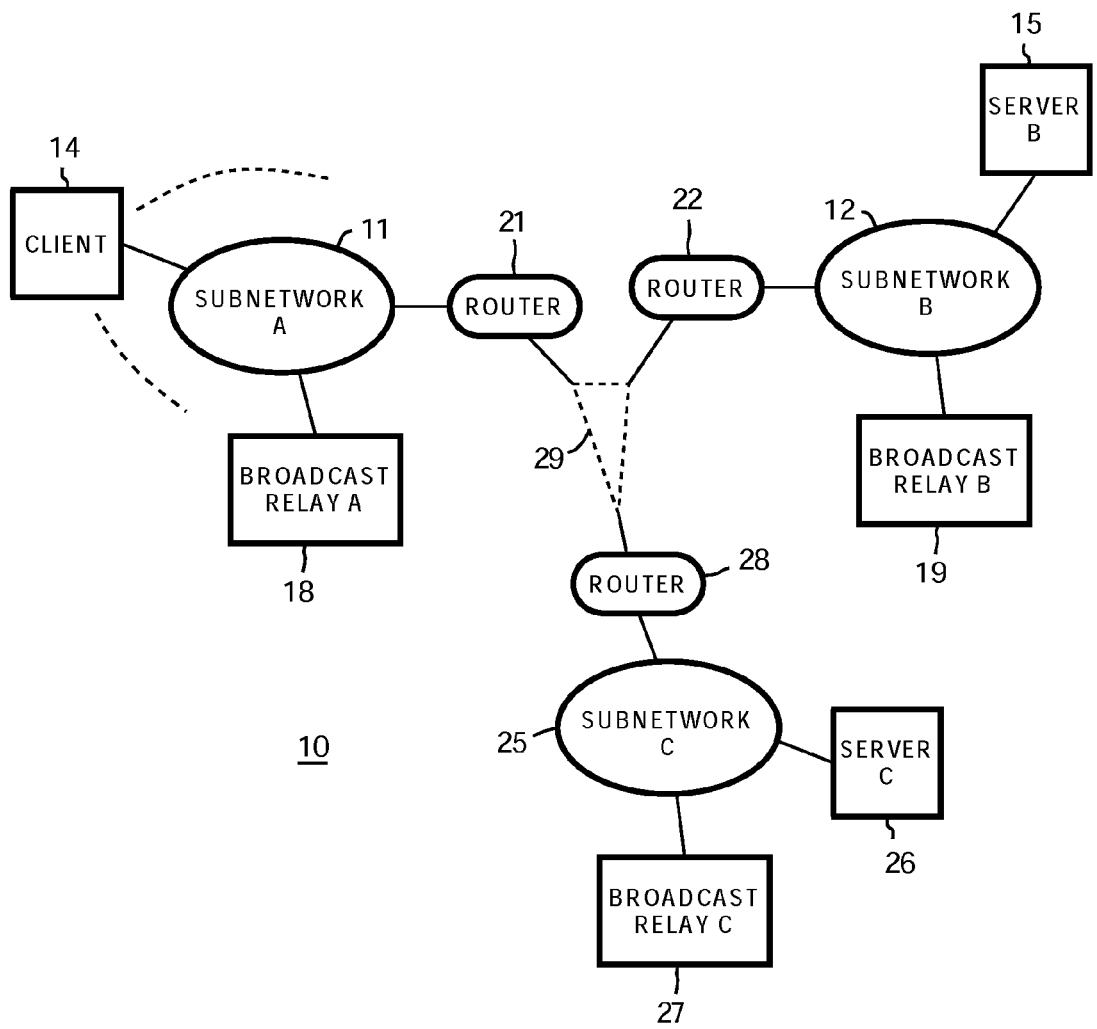
FIG. 3 is a block diagram of a further different broadcast processing system.

FIG. 3 shows a further configuration of the broadcast processing system 10. The same components as those in FIG. 2 are denoted by the same reference numerals, which will not be described further, and the differences from the configuration of FIG. 2 will be mainly described. In the configuration of FIG. 3, a subnetwork C (reference numeral 25) is added to the configuration of FIG. 2. A server C (reference numeral 26), broadcast relay C (reference numeral 27) and router 28, each of which is associated with the subnetwork C, correspond to the broadcast relay B, server B (reference numeral 15) and router 22 of the subnetwork B, respectively. The router 28 controls passage of IP packets to the inside and outside of the subnetwork C. Like the routers 21 and 22, the router 28 prevents the network-wide broadcast in the subnetwork C from going out of the subnetwork C. The routers 21, 22 and 28 are interconnected by a plurality of communication channels 29 including the Internet 23 (FIG. 2). One of the clients 14 belonging to the subnetwork A outputs a network-wide broadcast to the subnetwork A. When the broadcast relay A detects the network-wide broadcast packet, the broadcast relay A generates a unicast address changed packet B in which the destination address of the network-wide broadcast packet is changed to the IP address of the broadcast relay B and a unicast address changed packet C in which the destination address of the network-wide broadcast packet is changed to the IP address of the broadcast relay C, and outputs the address changed packets B and C to the subnetworks A. Since the address changed packets B and C are unicast packets and have the destination addresses outside the subnetworks A, the router 13 sends the address changed packets to the outside of the subnetwork A so that the address changed packets reach the subnetworks B and C. When the broadcast relays B and C detect the address changed packets B and C which are IP packets in which the destination addresses are the IP addresses of the broadcast relays B and C, respectively, the broadcast relays B and C generate local broadcast packets in which the destination addresses of the IP packets are changed to the IP addresses related to the broadcasts dedicated to the subnetworks B and C, and then output the local broadcast packets to the subnetworks B and C, respectively. Thereafter, the servers B and C receive the local broadcast packets. Each of the servers B and C checks a port number of a segment related to TCP (Transmission Control Protocol) or UDP (User Datagram Protocol) in the received packet, and performs a predetermined process if the port number corresponds to its own process. Typically, a network-wide broadcast delivered by one client 14 corresponds to a process to be performed by either the server B or C. Even when the servers B and C receive the local broadcast packets, they do nothing if the packets are not of the processes to be performed by them.

For convenience of description, the following description will be given on the assumption that the network-wide broadcast delivered by the client 14 this time is the one to be processed by the server C. The results of processing by the server C are outputted to the subnetwork C by a network-wide broadcast packet. In response to the network-wide broadcast outputted by the server C, the broadcast relay C generates an address changed packet which is an IP packet in which only the destination address of the network-wide broadcast packet is changed to the IP address of the broadcast relay A, and then outputs the address changed packet to the subnetwork C. The address changed packet passes the routers 28 and 21 and reaches the subnetwork A. When the broadcast relay A receives the IP packet whose destination address is the IP address of the broadcast relay A, the broadcast relay A changes the destination address of the IP packet to the IP address corresponding to the subnetwork A-only broadcast, and outputs it to the subnetwork A. The client 14 receives the local broadcast IP packet outputted by the broadcast relay A to obtain thereby the results of processing from the server C for the process request which the client 14 has issued by means of the network-wide broadcast.

Figure 4:
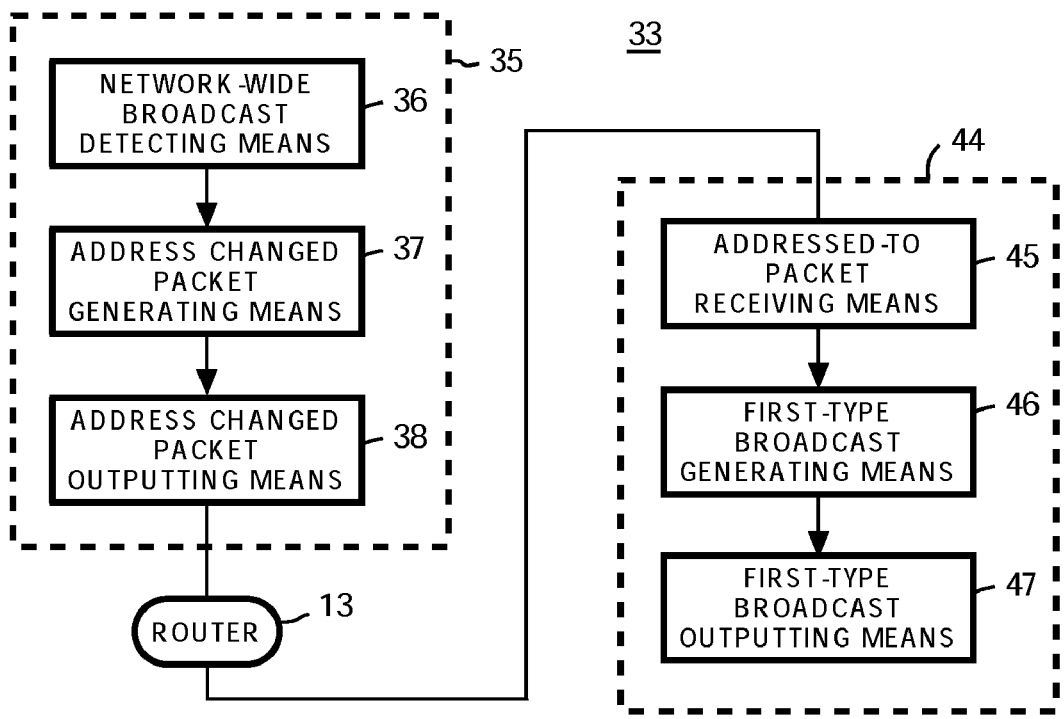
FIG. 4 is a block diagram of a broadcast processing apparatus.

FIG. 4 shows a configuration of a broadcast processing apparatus 33 having a sending broadcast processing apparatus 35 and receiving broadcast processing apparatus 44. Each of the aforementioned broadcast relays A, B and C implements both the sending broadcast processing apparatus 35 and receiving broadcast processing apparatus 44. The broadcast relays A, B and C may function as the sending broadcast processing apparatus 35 or may function as the receiving broadcast processing apparatus 44. For convenience of description, it is assumed that the sending broadcast processing apparatus 35 and receiving broadcast processing apparatus 44 are implemented in the broadcast relays A and B, respectively. The sending broadcast processing apparatus 35 has a network-wide broadcast detecting means 36 for detecting the network-wide broadcast in the subnetwork A, address changed packet generating means 37 for generating a unicast address changed packet in which the destination address of the network-wide broadcast packet related to the network-wide broadcast detected by the network-wide broadcast detecting means 36 is changed to the address of the receiving broadcast processing apparatus 44, and address changed packet outputting means 38 for outputting the address changed packet inside the subnetwork A. Since the address changed packet outputted inside the subnetwork A by the address changed packet outputting means 38 is a unicast IP packet and its destination address is outside the subnetwork A, it passes the router 13 to reach the subnetwork B. The receiving broadcast processing apparatus 44 has an addressed-to packet receiving means 45 for receiving a packet whose destination address specifies the receiving broadcast processing apparatus 44 (=a host implementing the receiving broadcast processing apparatus 44), first-type broadcast generating means 46 for generating a first-type broadcast packet in which the destination address of the addressed-to packet received by the receiving means 45 is changed to the one related to a first-type broadcast, and first-type broadcast outputting means 47 for outputting the first-type broadcast packet generated by the first-type broadcast generating means 46 inside the subnetwork B. Thus, it is possible to convey the network-wide broadcast delivered by a client 14 belonging to the subnetwork A to the server 15 belonging to the subnetwork B different from the subnetwork A. The client 14 can receive the results of processing of the server 15 for its process request without trouble. The first-type broadcast is, for example, a broadcast dedicated to the subnetwork to which the receiving broadcast processing apparatus 44 belongs, that is, subnetwork-only or local broadcast.

Figure 5:
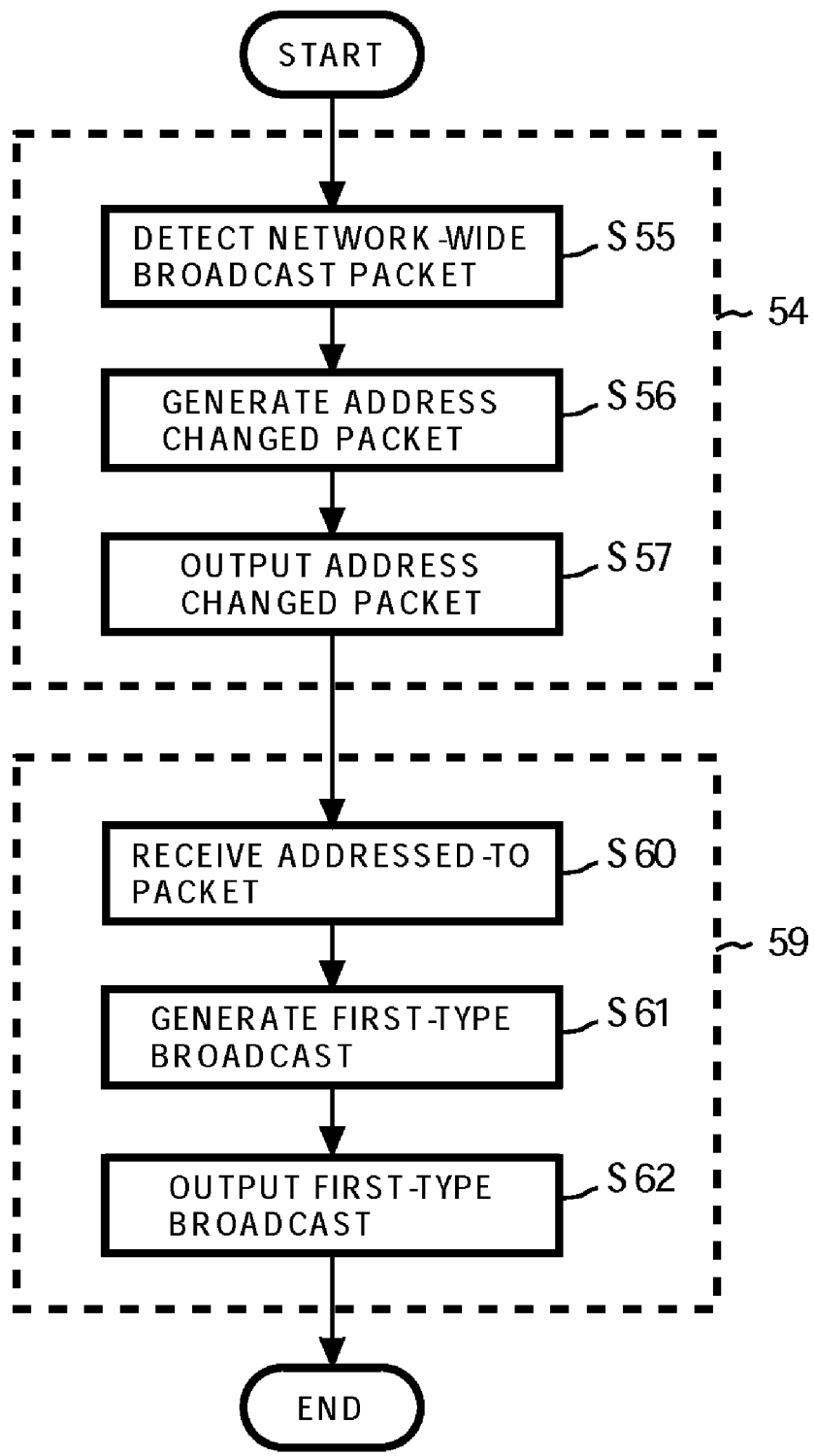
FIG. 5 is a flowchart of a broadcast processing method.

FIG. 5 is a flowchart of the broadcast processing method according to the present invention. The broadcast processing method has a sending portion 54 and receiving portion 59. The sending portion 54 and receiving portion 59 are implemented in the sending broadcast processing apparatus and receiving broadcast processing apparatus, respectively. The sending portion 54 includes steps S55 to S57 and the receiving portion 59 includes steps S60 to S62. S55 (network-wide broadcast detecting step) detects a network-wide broadcast in a first subnetwork. S56 (address changed packet generating step) generates a unicast address changed packet in which the destination address of the network-wide broadcast packet related to the network-wide broadcast detected in S55 is changed to the address of the receiving broadcast processing apparatus. S57 (address changed packet outputting step) outputs the address changed packet inside the first subnetwork. S60 (receiving step) receives a packet in which the destination address is the address of the receiving broadcast processing apparatus. S61 (first-type broadcast generating step) generates a first-type broadcast packet in which the destination address of the packet received in S60 is changed to the one related to the first-type broadcast. S62 (first-type broadcast outputting step) outputs the first-type broadcast packet generated in S61 inside a second subnetwork. The first-type broadcast is, for example, a broadcast dedicated to the subnetwork to which it is outputted.

Figure 6:
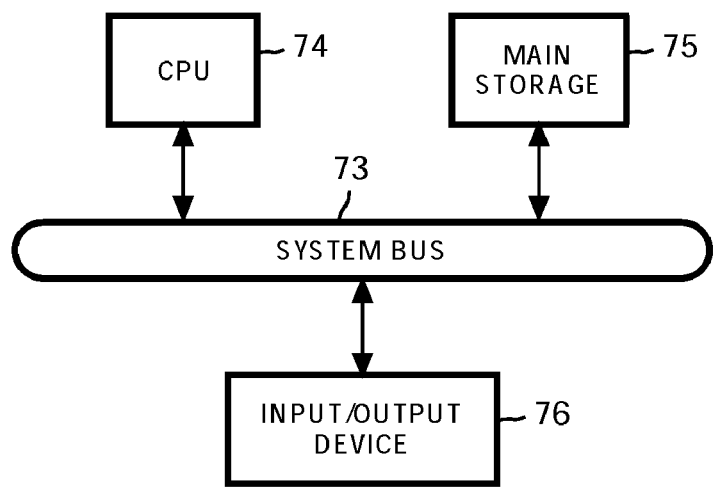
FIG. 6 is a hardware block diagram for executing a program related to the flowchart in FIG. 5.

FIG. 6 shows a hardware configuration for executing the program related to the flowchart of FIG. 5. Each step of the method related to the flowchart of FIG. 5 can be executed by using the hardware shown in FIG. 6. A system bus 73 has a CPU 74, main storage 75 and input/output device 76 connected thereto. The method related to the flowchart of FIG. 5 described above is executable as a coded program. The input/output device 76 includes an auxiliary storage such as a hard disk drive storing the program, and the program is stored in the main storage 75 before execution by the CPU 74. The CPU 74 executes the program by sequentially reading instructions of the program from the main storage 75.

ADVANTAGES OF THE INVENTION

According to the present invention, even if a router is set to prevent a network-wide broadcast from going out of a subnetwork, it is possible to send the network-wide broadcast in a first subnetwork to each host in a second subnetwork different from the first subnetwork.

What is claimed is:

1. A broadcast processing system comprising:

a first subnetwork comprising a first device and a first broadcast relay;

a router in communication with the first subnetwork; and a second subnetwork different from the first subnetwork and in communication with the router, the second subnetwork comprising a second device and a second broadcast relay;

wherein the router is configured to prevent a first subnetwork network wide broadcast packet from the first subnetwork from reaching the second subnetwork;

wherein the first broadcast relay is configured to detect a first subnetwork network wide broadcast packet from the first device in the first subnetwork, and in response to the detected packet having a first subnetwork network-wide destination address, a broadcast host address and a destination port number, generate a unicast address changed packet from the detected packet by changing the network wide destination address to a unicast address of the second broadcast relay in the second subnetwork, and output said unicast address changed packet through the router to the second broadcast relay;

wherein the second broadcast relay is configured to receive in said second subnetwork the unicast address changed packet addressed to said second receiving broadcast relay, generate a second subnetwork-type broadcast packet by changing the destination unicast address of the packet received by said second receiving broadcast relay to an address related to a second subnetwork-type broadcast, and output said generated second subnetwork-type broadcast packet inside said second subnetwork; and wherein the second subnetwork second device is configured to receive the second subnetwork-type broadcast packet, check a port number of a protocol segment of the received second subnetwork-type broadcast packet, and perform a predetermined process if the port number corresponds to a process of the second device or take no action if the port number does not correspond to a process of the second device.

2. The broadcast processing system according to claim 1, wherein said second subnetwork-type broadcast is a broadcast dedicated to the subnetwork in which it is outputted.

3. The broadcast processing system according to claim 2, comprising another router and a third subnetwork different from said first and second subnetworks, said third subnetwork interconnecting the first and second subnetworks via the router and the another router.

4. The broadcast processing system according to claim 3, wherein the third subnetwork is the Internet.

5. The broadcast processing system according to claim 2, wherein the second device is further configured to perform the predetermined process, output a process result second subnetwork network wide broadcast packet from performing the predetermined process related to the first subnetwork network wide broadcast packet;

wherein the second broadcast relay is configured to detect the result packet, generate a unicast address changed packet from the result packet by changing a network wide destination address to a unicast address of the first broadcast relay and output the unicast address changed result packet through the router to the first broadcast relay;

wherein the first broadcast relay is configured to receive in said first subnetwork the unicast address changed result packet, change the destination unicast address of the result packet and output said changed result packet to a predetermined client on the first subnetwork; and wherein the predetermined client is configured to receive the changed result packet, check a port number of a protocol segment of the changed result packet, and perform a predetermined client process if the port number corresponds to a process of the predetermined client or take no action if the port number does not correspond to a process of the predetermined client.

6. The broadcast processing system according to claim 5, wherein the first subnetwork broadcast client is configured to broadcast the first subnetwork network wide broadcast packet, wherein the first subnetwork predetermined client is different from the first subnetwork broadcasting client.

7. An article of manufacture comprising a computer readable medium, the computer readable medium comprising computer executable program code, wherein the program code, when deployed and executed on a computer system, causes the computer system to:

in response to detecting a first subnetwork network wide broadcast packet in a first subnetwork, the packet having a first subnetwork network-wide destination address, a broadcast host address and a destination port number, generate a unicast address changed packet from the detected packet by changing the network wide destination address to a unicast address of a second broadcast relay in the second subnetwork;

output said unicast address changed packet through a router to the second broadcast relay, the router configured to prevent the first subnetwork network wide broadcast packet from reaching the second subnetwork;

cause the second broadcast relay to generate a second subnetwork-type broadcast packet by changing the destination unicast address of the unicast address changed packet to an address related to a second subnetwork-type broadcast in said second subnetwork;

cause the second broadcast relay to output said generated second subnetwork-type broadcast packet inside said second subnetwork; and cause the second device on the second subnetwork to receive the second subnetwork-type broadcast packet, check a port number of a protocol segment of the second subnetwork-type broadcast packet; and perform a predetermined process if the port number corresponds to a process of the second device or take no action if the port number does not correspond to a process of the second device.

8. The article of manufacture of claim 7, the program code comprising instructions which, when executed on the computer system, causes the computer system to:

cause the second device to output a process result second subnetwork network wide broadcast packet from the processing operation related to the first subnetwork network wide broadcast packet;

cause the second broadcast relay to detect the result packet, generate a unicast address changed packet from the result packet by changing a network wide destination address to a unicast address of the first broadcast relay and output the unicast address changed result packet through the router to the first broadcast relay;

cause the first broadcast relay to receive in said first subnetwork the unicast address changed result packet, change the destination unicast address of the result packet and output said changed result packet to a predetermined client on the first subnetwork; and cause the predetermined client to receive the changed result packet, check a port number of a protocol segment of the changed result packet and perform a predetermined client process if the port number corresponds to a process of the predetermined client or take no action if the port number does not correspond to a process of the predetermined client.

* * * * *